(12) United States Patent
Hallock

(10) Patent No.: US 8,713,191 B1
(45) Date of Patent: Apr. 29, 2014

(54) METHOD AND APPARATUS FOR ESTABLISHING A MEDIA CLIP

(75) Inventor: Jeff D. Hallock, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1633 days.

(21) Appl. No.: 11/561,429

(22) Filed: Nov. 20, 2006

(51) Int. Cl.
*G06F 15/16* (2006.01)

(52) U.S. Cl.
USPC .......................................................... 709/231

(58) Field of Classification Search
USPC .......................................................... 709/231
See application file for complete search history.

(56) References Cited

U.S. PATENT DOCUMENTS

| | | | |
|---|---|---|---|
| 5,870,683 A * | 2/1999 | Wells et al. | 455/566 |
| 5,991,306 A | 11/1999 | Burns et al. | |
| 6,414,725 B1 | 7/2002 | Clarin et al. | |
| 6,473,099 B1 | 10/2002 | Goldman et al. | |
| 6,571,255 B1 | 5/2003 | Gonsalves et al. | |
| 6,714,826 B1 | 3/2004 | Curley et al. | |
| 6,847,892 B2 | 1/2005 | Zhou et al. | |
| 6,943,681 B2 | 9/2005 | Rezvani et al. | |
| 6,993,246 B1 | 1/2006 | Pan et al. | |
| 6,993,349 B2 | 1/2006 | Martinez et al. | |
| 7,005,963 B1 | 2/2006 | Scalisi et al. | |
| 7,031,437 B1 | 4/2006 | Parsons et al. | |
| 7,103,391 B2 | 9/2006 | Chan | |
| 7,136,482 B2 | 11/2006 | Wille | |
| 7,142,645 B2 * | 11/2006 | Lowe | 379/88.16 |
| 7,162,220 B2 * | 1/2007 | Hanson | 455/405 |
| 7,221,855 B2 | 5/2007 | Kim et al. | |
| 7,391,300 B2 | 6/2008 | Inkinen | |
| 7,409,569 B2 | 8/2008 | Illowsky et al. | |
| 7,424,446 B2 | 9/2008 | Emodi et al. | |
| 2003/0109251 A1 | 6/2003 | Fujito et al. | |
| 2004/0032946 A1 | 2/2004 | Koser et al. | |
| 2004/0234250 A1 | 11/2004 | Cote et al. | |
| 2005/0129196 A1 | 6/2005 | Creamer et al. | |

(Continued)

FOREIGN PATENT DOCUMENTS

WO    WO 2006/002645 A1    1/2006
WO    WO 2006002645 A1 *   1/2006

OTHER PUBLICATIONS (Schulzrinne, et. al. (RFC 2326—Real Time Streaming Protocol (RTSP)), published Apr. 1998.*

(Continued)

*Primary Examiner* — Larry Donaghue
*Assistant Examiner* — Marshall McLeod

(57) ABSTRACT

A method and apparatus for establishing a media clip for such uses as a ring tone at a client station and a ring-back tone by a cellular wireless network. A client station receives streaming media from a network system. During presentation of the streaming media at the client station, the client station receives user input identifying a first portion of the streaming media as a media clip start point (MCSP) and a second portion of the streaming media as a media clip end point (MCEP). The client station establishes a message indicating the identified MCSP and MCEP and transmits the message to the network system. In response to receiving the message, the network system establishes a media clip defined as a portion of the streaming media extending from the MCSP to the MCEP. The network system may transmit the media clip to the client station and/or the cellular wireless network.

33 Claims, 7 Drawing Sheets

(56) References Cited

U.S. PATENT DOCUMENTS

| | | | |
|---|---|---|---|
| 2005/0136988 | A1 | 6/2005 | Vilamil et al. |
| 2005/0170865 | A1* | 8/2005 | Harvej et al. ............ 455/567 |
| 2005/0185918 | A1 | 8/2005 | Lowe |
| 2005/0197167 | A1 | 9/2005 | Aoike |
| 2005/0227674 | A1 | 10/2005 | Kopra et al. |
| 2005/0286497 | A1 | 12/2005 | Zutaut et al. |
| 2006/0015649 | A1 | 1/2006 | Zutaut et al. |
| 2006/0028951 | A1 | 2/2006 | Tozun et al. |
| 2006/0060069 | A1 | 3/2006 | Sinisalo |
| 2006/0077055 | A1 | 4/2006 | Basir |
| 2006/0085188 | A1 | 4/2006 | Goodwin et al. |
| 2006/0095472 | A1* | 5/2006 | Krikorian et al. ......... 707/104.1 |
| 2006/0117040 | A1 | 6/2006 | Begeja et al. |
| 2006/0259434 | A1* | 11/2006 | Vilcauskas et al. ........... 705/57 |
| 2007/0112977 | A1 | 5/2007 | Hornal et al. |
| 2007/0201685 | A1 | 8/2007 | Sindoni |
| 2007/0204042 | A1 | 8/2007 | Noble |
| 2007/0226432 | A1* | 9/2007 | Rix ........................ 711/154 |
| 2007/0233905 | A1 | 10/2007 | Hatano et al. |
| 2008/0167993 | A1 | 7/2008 | Cue et al. |
| 2009/0029685 | A1* | 1/2009 | Willis ...................... 455/414.1 |

OTHER PUBLICATIONS

H. Schulzrinne et al., RTP: A Transport Protocol for Real-Time Applications, Network Working Group—Request for Comments: 3550, Jul. 2003.
LightWav 5 for Treo600/650 5.72, http://www/palmgear.com/index.cfm?fuseaction_software.showsoftware&PartnerREF=&site id=1&prodid=92488&siteid=1, printed from the world wide web on Sep. 27, 2005.
LightWav 5.7.2, http://mytreo.net/downloads/details-108.html?LightWav, printed from the world wide web on Sep. 27, 2005.
U.S. Appl. No. 11/217,654, filed Sep. 1, 2005, entitled "Automatic delivery of alerts including static and dynamic portions."
U.S. Appl. No. 11/237,058, filed Sep. 28, 2005, entitled "Automatic rotation through play out of audio-clips in response to detected alert events."
U.S. Appl. No. 11/237,058, entitled "Automatic Rotation through playout of audio-clips in response to detected alert events," filed Sep. 28, 2005.
U.S. Appl. No. 11/656,803, entitled "Method and system for demarcating a portion of a media file as a ringtone," filed Jan. 22, 2007.
Jason Fields, MP3 Speaking Ringtones for 802se, Mar. 8, 2005, downloaded from the world wide web at http://www.air-port.com/blog2/03/08/2005/mp3-speaking-ringtones-for-802se/.
Hayden Porter, Phone it in!, Feb. 1, 2004, downloaded from the world wide web at http://emusician.com/mag/desktop/emusic_phone/.
Pictones, downloaded from the world wide web on Sep. 1, 2005 at http://musiwave.net/pictones-multimedia-ringtones.html.
Musitones, downloaded from the world wide web on Sep. 1, 2005 at http://www.musiwave.net/musitones-real-music-ringtones.html.
Logo & Images, downloaded from the world wide web on Sep. 1, 2005 at http://www.musiwave.net/mobile-phone-services-provider.html.
"Theme Master—A Pocket PC Utility Used to Switch Your Today Screen Theme," Theme Master, http://www.theraggios.com/rpa/ThemeMaster.htm, printed from the World Wide Web on Dec. 7, 2005.
"Cell Phone Wallpaper," Free Cell Phone Wallpaper, http://www.flash-screen.com/free-wallpaper/cell-phone-wallpaper.html, printed from the World Wide Web on Dec. 6, 2005.
LightWav 5 for Treo600/650 5.72, http://www,palmgear.com/index.cfm?fuseaction=software.showsoftware&PartnerREF=&siteid=1&prodid=92488&siteid=1, printed from the World Wide Web on Sep. 27, 2005.
LightWAV 5.7.2, http://mytreo.net/downloads/details-108-html-?LightWav, printed from the World Wide Web on Sep. 27, 2005.
Verizon Wireless, VZW Tones, Feb. 22, 2005.
Caller Ringtones, http://crt.maxis.com.my/prbt/user_console/RbtAdmin/english/BrowsingPage.jsp, printed from the World Wide Web on Sep. 27, 2005.
U.S. Appl. No. 11/217,654, entitled "Automatic delivery fo custom ringtones including static and dynamic portions," filed Sep. 1, 2005.
U.S. Appl. No. 11/046,083, entitled "Method and system for calendar-based delivery of themed user-interface skins," filed Jan. 28, 2005.

* cited by examiner

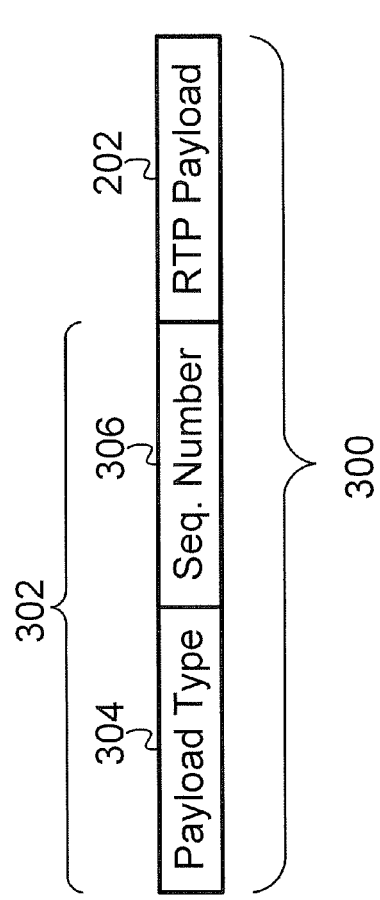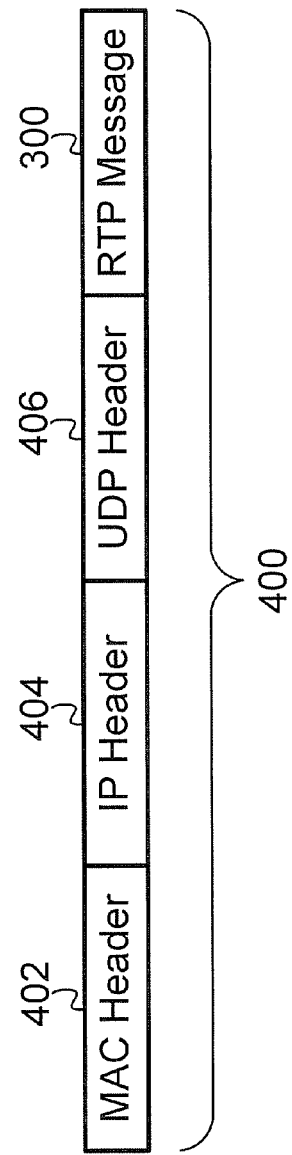
Figure 3
Figure 4

METHOD AND APPARATUS FOR ESTABLISHING A MEDIA CLIP

FIELD OF INVENTION

The present invention relates to network systems, and more particularly to using a network system to establish a media clip from an identified portion of a media stream sent to a client station from the network system.

DESCRIPTION OF RELATED ART

The popularity of wireless communications has grown significantly over recent years. Indeed, millions of people are using wireless communication devices (e.g., cellular phones, Personal Digital Assistants (PDAs), and wirelessly-equipped computers) to engage in voice and data communications. In principle, a user can communicate over the Internet or call anyone over the public switched telephone network (PSTN) from virtually anywhere within the coverage area of a cellular wireless network.

One area that has been experiencing tremendous growth in recent times is the streaming of real-time media such as video and audio content to wireless communication devices. Cellular phones, PDAs, and other wireless communication devices that are equipped with streaming media applications may engage in wireless packet data communications. Such wireless devices can interact with streaming media servers in much the same way that wireline personal computers have done for years, engaging in streaming media sessions to receive assorted real-time media content. Advantageously, however, wireless communication enables users to receive and enjoy streaming media content without being tethered to a desk or another fixed location.

Another area that has been experiencing tremendous growth in recent time is the downloading of pre-established media clips to wireless communication devices. Pre-established media clips are established prior to a user identifying the media clip to be downloaded to a wireless communication device. After downloading a pre-established media clip, a user may use the pre-established media clip to alert the user when the user's wireless communication device is receiving an incoming phone call.

SUMMARY

The present invention is directed to a method and apparatus for establishing a media clip defined as a portion of a media stream extending from a media clip start point to a media clip end point. A client station can receive the media stream from a network system and, during presentation of the media stream, receive user input identifying the media clip start point and the media clip end point. The network system can receive a message indicating the identified media clip start point and media clip end point so as to establish the defined media clip.

In one respect, an exemplary embodiment of the present invention may take the form of a method carried out at a client station. During presentation of streaming media sent to the client station from a network system, the method may include receiving user input identifying a first portion of the streaming media as a media clip start point and identifying a second portion of the streaming media as a media clip end point. The method may also include: (i) establishing at least one message indicating the identified media clip start point and the identified media clip end point, (ii) transmitting the at least one message to the network system to enable the network system to establish a media clip defined as a portion of the streaming media extending from the media clip start point to the media clip end point, and (iii) receiving the media clip established by the network system.

In another respect, an exemplary embodiment of the present invention may take the form of a client station that includes a communication interface, a user interface, a processor, and data storage. The communication interface can receive streaming media sent from a network system and transmit to the network system at least one message indicating an identified media clip start point and an identified media clip end point. The user interface can present the streaming media and, during presentation of the streaming media, receive user input identifying a first portion of the streaming media as the media clip start point and identifying a second portion of the streaming media as the media clip end point. The data storage can contain program logic executable by the processor. The program logic may be configured to: (i) cause the processor to establish the at least one message indicating the identified media clip start point and the identified media clip end point, and (ii) cause the communication interface to transmit the at least one message to the network system to enable the network system to establish a media clip defined as a portion of the streaming media extending from the media clip start point to the media clip end point.

In yet another respect, an exemplary embodiment of the invention may take the form of a method carried out at a network system. The method may include: (i) providing streaming media to a client station, (ii) receiving at least one message from the client station while providing the streaming media to the client station, wherein the at least one message indicates a media clip start point and a media clip end point identified by a user of the client station during presentation of the streaming media at the client station, and (iii) establishing a media clip defined as a portion of the streaming media extending from the media clip start point to the media clip end point.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which:

FIG. 3 depicts an exemplary RTP message;

FIG. 4 depicts an exemplary media stream message;

DETAILED DESCRIPTION

1. Overview

The present invention is directed to establishing a media clip defined as a portion of streaming media extending from a media clip start point to a media clip end point. A network system transmits the streaming media to the client station via a network. During presentation of the streaming media at the client station, the client station receives user input identifying a first portion of the streaming media as the media clip start point and identifying a second portion of the streaming media as the media clip end point. The client station may establish a message indicating the identified media clip start point and the identified media clip end point and then transmit the message to the network system. The network system may receive the message sent from the client station and responsively establish the defined media clip. The network system may transmit the established media clip to the client station and/or to another entity interfacing with the network.

2. Exemplary Architecture

Figure 1:
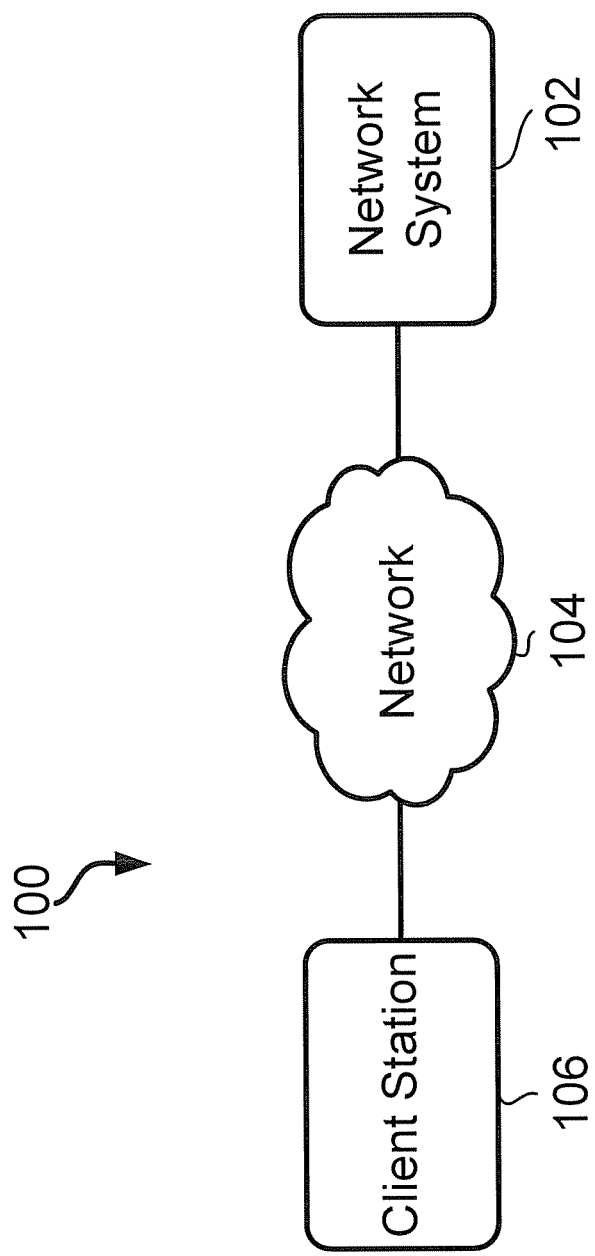
FIG. 1 depicts an exemplary system for carrying out the invention.

FIG. 1 is a block diagram of a system 100 arranged for carrying out the present invention. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, or as any suitable combination of hardware, firmware, and/or software.

As shown in FIG. 1, the system 100 includes a network system 102, a network 104, and a client station 106. The network system 102 and the client station 106 can interface with the network 104 and can communicate with each other via the network 104. One or more other client stations (not shown) and/or one or more other network servers (not shown) can also interface with the network 104 and can communicate with the network system 102 and client station 106 via the network 104.

The network 104 may be arranged in any of a variety of configurations. For example, the network 104 may be arranged as a wireline network and/or as a wireless network. Alternatively, the network 104 may be arranged as a network that includes a wireline network and a wireless network. As another example, the network 104 may comprise the Internet. Other exemplary arrangements for the network 104 are also possible.

A wireline network may be arranged in any of a variety of configurations. For example, a wireline network may include one or more electrical conductors (e.g., copper wires) and/or one or more optical fibers for performing wireline communications. As another example, the wireline network may be arranged as a local area network (LAN), a wide area network (WAN), or a synchronous optical network (SONET). Other examples of a wireline network are also possible.

A wireless network may be arranged as a cellular wireless network including a base transceiver station (BTS), a radio frequency (RF) air interface operating between the client station 106 and the BTS, a base station controller (BSC), and a mobile switching center (MSC). The BTS radiates RF signals away from the BTS to form a cell. The radiated RF signals are arranged according to an air interface protocol, such as a Code Division Multiple Access (CDMA) protocol. The BSC may provide connection interface to a packet-switched network gateway, such as a packet data serving node (PDSN). In this way, the BSC and the PDSN may provide means for the client station 106 to interface to the network system 102. The MSC may provide connection interface to a circuit-switched network such as the PSTN. In this way, the MSC and the PSTN may provide means for the client station 106 to interface to the network system 102.

Alternatively, or in combination, a wireless network may be arranged as a wireless access point connected to a wireline network. In this regard, the wireless access point may function according to an air interface protocol such as an 802.11 air interface protocol or a Bluetooth™ air interface protocol.

The network 104 provides means for performing communications between the network system 102 and the client station 106. For example, the network 104 provides means for the client station 106 to transmit to the network system 102 a message identifying a media clip start point and a media clip end point. As another example, the network 104 provides means for transporting streaming media from the network system 102 to the client station 106. As yet another example, the network 104 provides means for the network system 102 to transmit a media clip to the client station 106.

Streaming media is media (e.g., audio, video, and/or graphics) transmitted over a network in which a first portion of the media received by a user (e.g., the client station 106) can be presented to the user prior to or as a second portion of the media is being transmitted to the user. "Streaming media" and "media stream" are used synonymously herein.

Any of a variety of protocols may be used to transmit streaming media from the network system 102 to the client station 106. As an example, the Mobile Media Services (MMS) protocol may be used to transmit the streaming media. As another example, the Real-time Transport Protocol (RTP) may be used to transmit the streaming media. Other exemplary protocols for transmitting streaming media between the network system 102 and the client station 106 are also possible.

Figure 2:
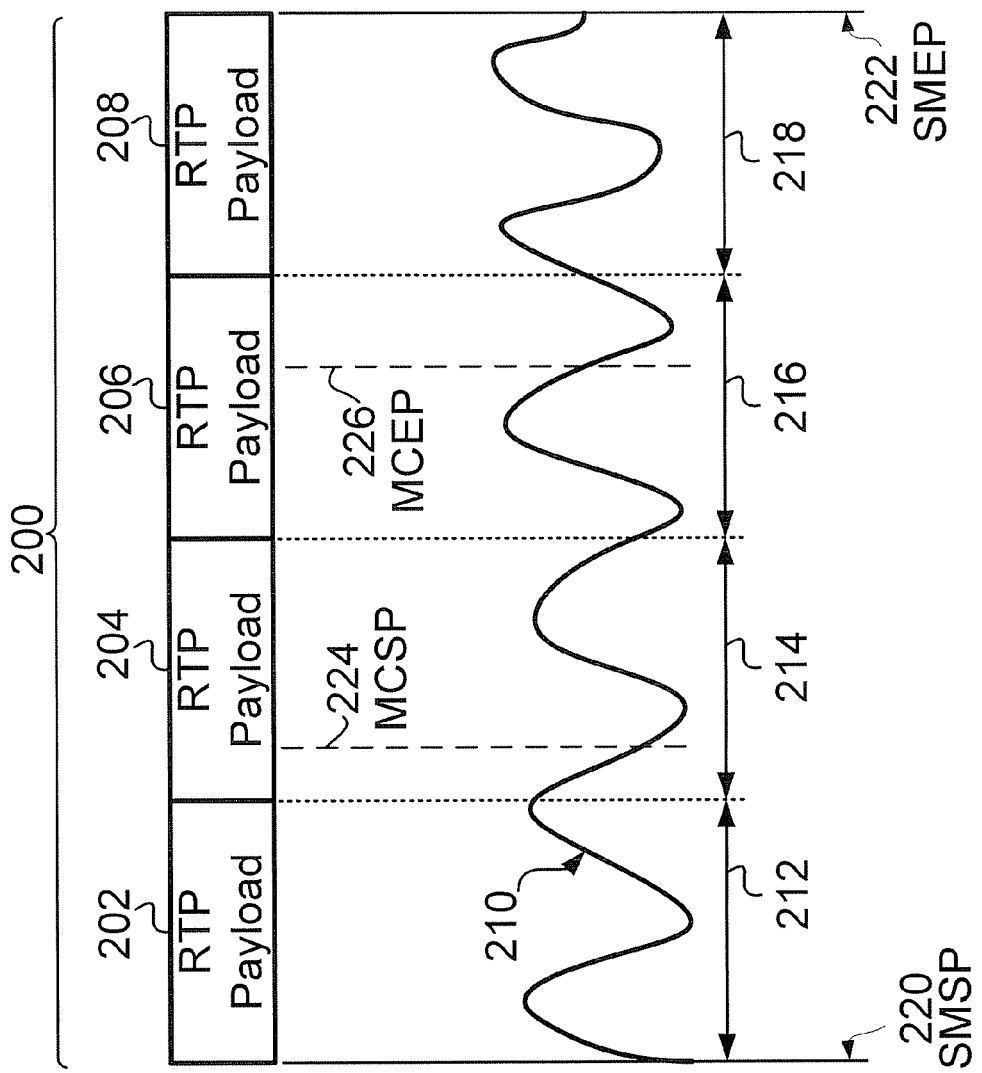
FIG. 2 depicts an exemplary media stream.

RTP is defined in Request For Comments: 3550, RTP: A Transport Protocol for Real-Time Applications, July 2003 (hereinafter RFC 3550), which is incorporated herein by reference for all purposes. FIG. 2 depicts an exemplary and simplified media stream 200 arranged according to the RTP. The media stream 200 may consist of a first RTP payload 202, a second RTP payload 204, a third RTP payload 206, and a fourth RTP payload 208. Alternatively, the media stream 200 may comprise a number of RTP payloads greater than or less than four RTP payloads.

Each RTP payload may consist of data representing a media file presentable at the client station 106. In one respect, the data carried by the RTP payloads 202, 204, 206, 208 may represent a graphical image or a video presentable via a display at the client station 106. In another respect, the data carried by the RTP payloads 202, 204, 206, 208 may represent an audio signal 210 presentable via a speaker at the client station 106. In particular, the first RTP payload 202 may represent a first portion 212 of the analog signal 210, the second RTP payload 202 may represent a second portion 214 of the analog signal 210, the third RTP payload 204 may represent a third portion 216 of the analog signal 210, and the fourth RTP payload 202 may represent a fourth portion 218 of the analog signal 210. Other examples of the data carried by the media stream 200 are also possible.

The media stream 200 is arranged in a sequence in which the media stream 200 would typically be presented to a user when the entire streaming media is being presented. In this regard, a first data bit of the first RTP payload 202 may be designated as the streaming media starting point (SMSP) 220 and a last data bit of the fourth RTP payload 208 may be designated as the streaming media end point (SMEP) 222. FIG. 2 depicts a media clip start point (MCSP) 224 that differs from the SMSP 220 and a media clip end point (MCEP) 226 that differs from the SMEP 222. Alternatively, the MCSP 224 may be equivalent to the SMSP 220 and the MCEP 226 may be equivalent to the SMEP 222.

The first RTP payload 202, as well as each of the other RTP payloads 204, 206, 208, may be part of a respective RTP message. FIG. 3 depicts an exemplary RTP message 300. The streaming media 200 may include the RTP message 300. The RTP message 300 consists of an RTP message header 302 and the first RTP payload 202. The RTP message header 302 may consist of a payload type 304 and a sequence number 306.

The payload type 304 may identify the format of the first RTP payload 202. As an example, the payload type 304 may have a value of 14 to identify the format of the first RTP payload 202 as MPA audio (e.g., Motion Picture Experts Group 1 (MPEG 1)). As another example, the payload type 304 may have a value of 26 to identify the format of the first RTP payload 202 as Joint Photograph Experts Group (JPEG) video. Other examples of the type of payload that may be identified by the payload type 304 are also possible.

The sequence number 306 may identify a position of first RTP payload 202 relative to other RTP payloads in the media stream 200. Each RTP message carrying RTP payloads 202, 204, 206, 208 may include a sequence number. The sequence numbers for RTP messages consisting of RTP payloads 202, 204, 206, 208 increment by one for each RTP subsequent payload sent. For example, the sequence numbers for the RTP payloads 202, 204, 206, 208 may be 1, 2, 3, 4, respectively.

The client station 106 may use the sequence number 306 and other sequence numbers to detect loss of an RTP payload and to restore an RTP payload sequence. In this regard, if the client station 106 receives the third RTP payload 206 prior to receiving the second RTP payload 204, the client station 106 can use the sequence numbers to arrange the second RTP payload 204 and the third RTP payload 206 in the sequence shown in FIG. 2.

FIG. 4 depicts an exemplary media stream message 400. The media stream 200 may include the media stream message 400. The media stream message 400 may include a Media Access Control (MAC) header 402, an Internet Protocol (IP) header 404, a User Datagram Protocol (UDP) header 406, and the RTP message 300. In this way, the media stream message 400 includes the first RTP payload 202.

The MAC header 402 and the IP header 404 may each include an address usable to direct the media stream message 400 to the client station 106. The UDP header 406 may include a source port number of the network system 102, a destination port number of the client station 106, a datagram size, and a checksum. The destination port number can be used to direct at least a portion of the media stream message 400 to a particular destination port of the client station 106. In this regard, only a portion of the media stream message 400 may be sent to the destination port since the client station 106 may remove the MAC header 402 and the IP header 404 from the media stream message 400. The MAC header 402, the IP header 404, and the UDP header 406 may be arranged according to any method known to those having ordinary skill in the art.

Figure 5:
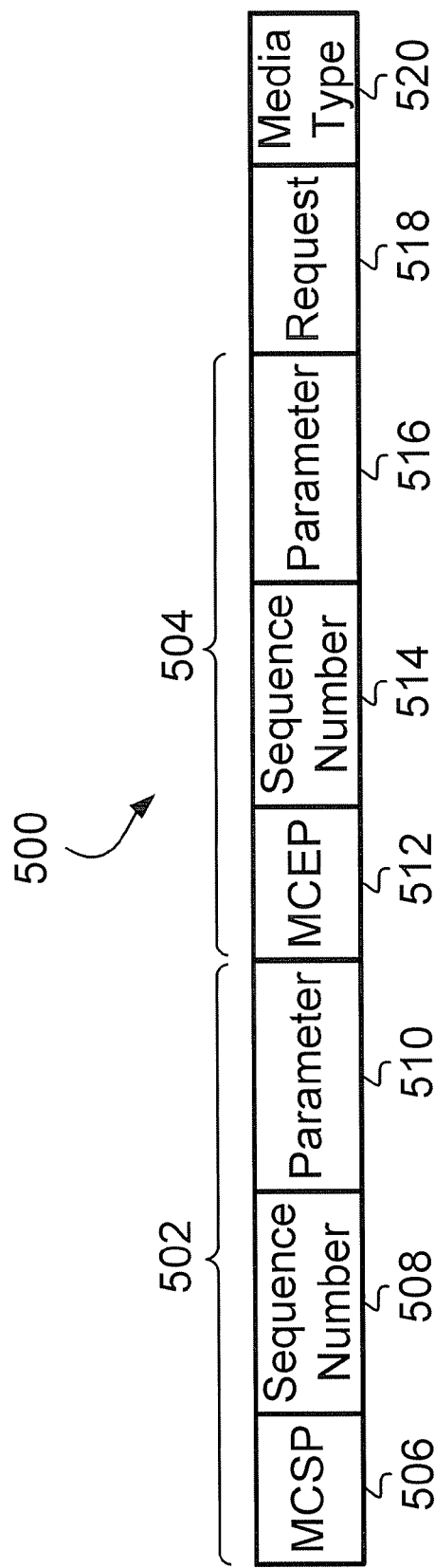
FIG. 5 depicts an exemplary message to request a network system to establish a media clip.

FIG. 5 depicts an exemplary message 500 that can be sent to the network system 102 to establish a media clip defined as a portion of a media stream extending from the media clip start point (MCSP) 224 to the media clip end point (MCEP) 226. The message 500 includes MCSP definition 502 and MCEP definition 504. The message 500 may be arranged according to any of a variety of protocols, such as the Real Time Streaming Protocol (RTSP) or the Hyper Text Transfer Protocol (HTTP).

The MCSP definition 502 may include a MCSP header 506, a MCSP sequence number 508, and a MCSP parameter 510. The MCSP header 506 may identify that the data immediately following the MCSP header 506 (and prior to a MCEP header 512) pertains to the MCSP 224. The MCSP sequence number 508 can identify a sequence number associated with the second RTP payload 204.

The MCSP parameter 510 may be arranged in various configurations. For example, the MCSP parameter 510 may be arranged to indicate a number of data bits of the second RTP payload 204 presented prior to detection of user input identifying the MCSP 224 or a number of data bits of the second RTP payload 204 remaining to be presented at the time the user input identifying the MCSP 224 is detected. Alternatively, or in combination, the MCSP parameter 510 may indicate how long (in time, e.g., seconds) the client station 106 has been presenting the second RTP payload 204 at the time user input identifying the MCSP 224 is detected or how much additional time (e.g., seconds) is required to finish presenting the second RTP payload 204 at the time user input identifying the MCSP 224 is detected.

The MCEP definition 504 may include the MCEP header 512, a MCEP sequence number 514, and a MCEP parameter 516. The MCEP header 512 may identify that the data immediately following the MCEP header 512 (and prior to a request 518) pertains to the MCEP 226. The MCEP sequence number 514 can identify a sequence number associated with the third RTP payload 206.

The MCEP parameter 516 may be arranged in various configurations. For example, the MCEP parameter 516 may be arranged to indicate a number of data bits of the third RTP payload 206 presented prior to detection of user input identifying the MCEP 226 or a number of data bits of the third RTP payload 206 remaining to be presented at the time the user input identifying the MCEP 226 is detected. Alternatively, or in combination, the MCEP parameter 516 may indicate how long (in time, e.g., seconds) the client station 106 has been presenting the third RTP payload 206 at the time user input identifying the MCEP 226 is detected or how much additional time (e.g., seconds) is required to finish presenting the third RTP payload 206 at the time user input identifying the MCEP 226 is detected.

The message 500 may also include a request 518. In one respect, the request 518 may be sent to ask the network system 102 to establish a media clip. Alternatively, a request to establish a media clip may be implied by merely sending the message 500 to the network system 102. In another respect, the request 518 may be sent to ask the network system 102 to use the media clip as a ringback tone or to provide the media clip to another server that can use the media clip as a ringback tone or for any other purpose.

The message 500 may also include a media type request 520. The media type request 520 may be sent to ask the network system 102 to establish the media clip in a format different than the format of the streaming media 200 sent to the client station. For example, the streaming media 200 may consist of data arranged in an MP3 format and the media type request 520 may consist of a request asking the network system 102 to establish the media clip as a .wav (Waveform Audio) file.

Figure 6:
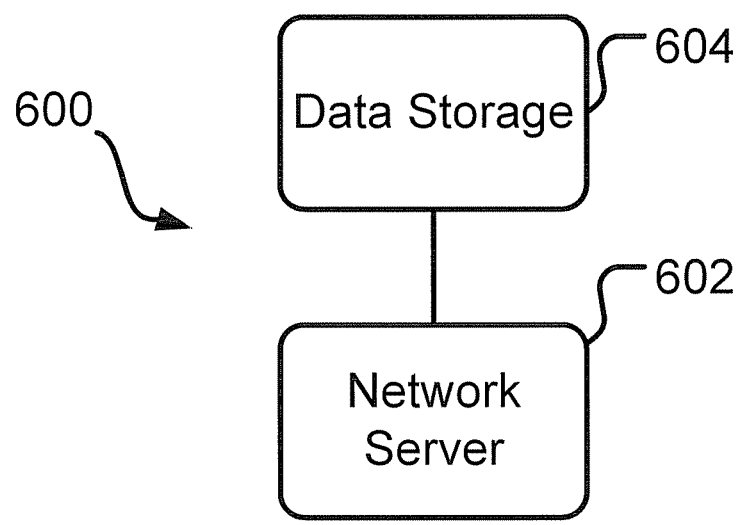
FIG. 6 is a block diagram of an exemplary network system.

FIG. 6 depicts an exemplary network system 600. The network system 102 shown in FIG. 1 may be arranged as the network system 600. As shown in FIG. 6, the network system 600 includes a network server 602 and data storage 604.

The network server 602 may perform services for the client station 106. As an example, the services performed by the network server 602 may include transmitting streaming media to the client station 106, establishing a media clip, and transmitting the media clip to the client station 106. Alternatively, the network system 600 may comprise two or more network servers. In this way, a first network server (e.g., network server 602) may perform a service such as transmitting streaming media to the client station 106, and a second network server (not shown) may perform services such as establishing a media clip and transmitting the media clip to the client station 106.

The network server 602 may be arranged in any of a variety of configurations. For example, the network server 602 may comprise: (i) a processor that executes program logic to perform services, and/or (ii) the program logic executable by the processor to perform the services.

The data storage 604 comprises a computer-readable medium readable by a processor (e.g., a processor within the network server 602). The computer-readable medium may comprise volatile and/or non-volatile storage components, such as optical, magnetic, organic or other memory or disc storage, which can be integrated in whole or in part with the network server 602. Alternatively, the entire computer-readable medium may be remote from the network server 602.

As an example, the data storage 604 may store one or more media files that may be transmitted to the client station 106 as streaming media. As another example, the data storage 604 may store one or more media clips established for the client station 106.

As another example, the data storage 604 may store program logic. For example, the data storage 604 may store program logic that causes the network server 602 to transmit a media file stored in the data storage 604 to the client station 106. The network server 602 may transmit the media clip in response to receiving a message including a request asking the network server to establish a media clip (e.g., message 500). Other examples of data that may be stored in the data storage 604 are also possible.

As yet another example, the data storage 604 may store data arranged as account data for an account associated with a user of the client station 106. A wireless carrier that manages the network system 102 may provide a user of the client station 106 with access to the network system 102 and manage the account associated with the user of the client station 106. As an example, the account data stored in the data storage 604 may include data that identifies the services (e.g., establishing a media clip) the network system 102 may provide to the user of the client station 106. As another example, the account data stored in the data storage 604 may include data representing a fee charged to the user for the network system 102 to establish a media clip requested by the user. Other examples of account data stored in the data storage 604 are also possible.

Figure 7:
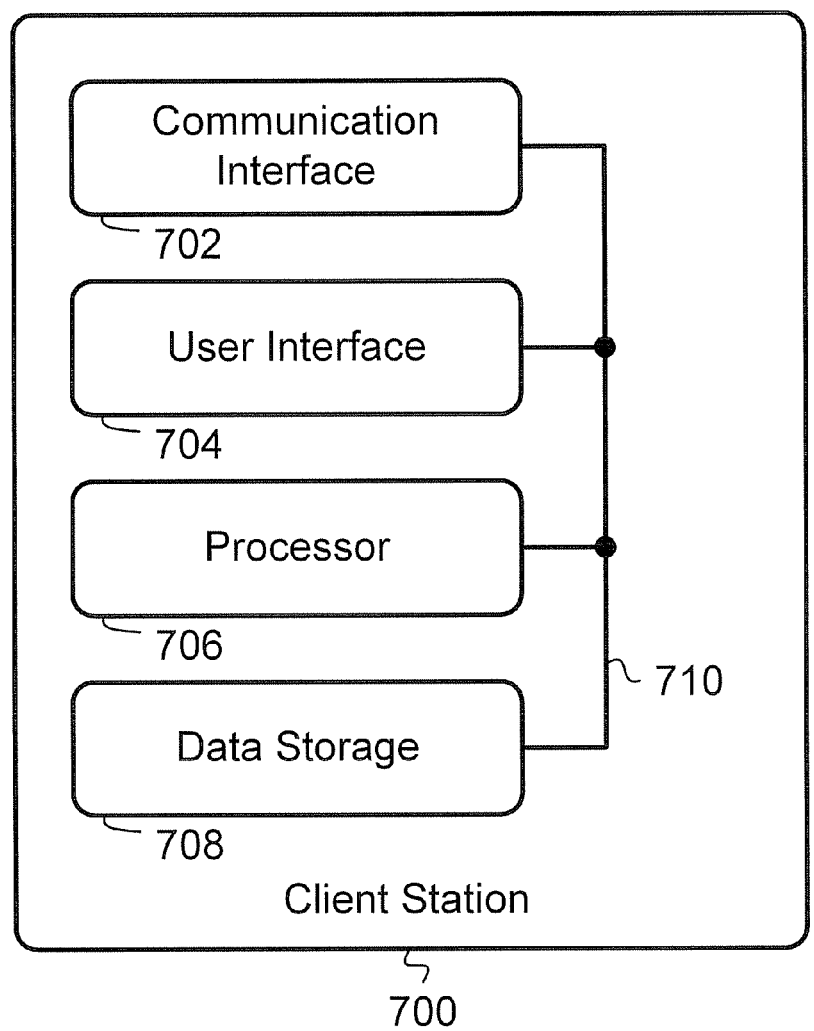
FIG. 7 is a block diagram of an exemplary client station.

FIG. 7 depicts an exemplary client station 700 in accordance with the present invention. The client station 700 may comprise a cellular wireless device such as a cellular telephone, a Personal Digital Assistant (PDA) having a cellular network interface, or a desktop computer having a cellular network interface. In particular, as shown in FIG. 7, the client station 700 may include a communication interface 702, a user interface 704, a processor 706, and data storage 708, all linked together via a system bus, network, or other connection mechanism 710. The client station 106 shown in FIG. 1 may be arranged as the client station 700.

The communication interface 702 provides means for interfacing with the network 104 and, in turn, with the network system 102. In this regard, the communication interface 702 may transmit various types of data to the network 104 and/or receive various types of data from the network 104. For example, the communication interface 702 can receive a media stream sent from the network system 102. As another example, the communication interface 702 can transmit to the network system 104 at least one message indicating an identified media clip start point and an identified media clip end point. As yet another example, the communication interface 702 can receive one or more media clips sent from the network system 102. Other examples of the data the communication interface 702 can receive or transmit are also possible.

The communication interface 702 may include a chipset and antenna for performing wireless communication over a wireless air interface of the network 104. An exemplary chipset that facilitates communication according to the CDMA air interface protocol is the MSM6000™ chipset manufactured by Qualcomm Incorporated of San Diego, Calif. The MSM6000™ may work in combination with the RFR6185 and RFT6150 chipsets also manufactured by Qualcomm Incorporated. Other examples of a chipset for performing wireless communication over a wireless air interface of the network 104 and other examples of air interface protocols are also possible.

Alternatively, or in combination, the communication interface 702 may include a chipset for performing wireline communications. Performing wireline communications may include transmitting data using a fixed, physical connection, such as metal wire or fiber optic cable. The chipset for performing wireline communications may be mounted on a network interface card (NIC). An exemplary NIC with a chipset for performing wireline communications according to the Institute of Electrical and Electronics Engineers (IEEE) 802.3® standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

The user interface 704 provides means for a user to interact with the client station 700. As an example, the user interaction between the client station 700 and a user may include presenting streaming media and/or a media clip to the user. In one respect, the user interface 704 may include a display for visually presenting the streaming media and/or the media clip. The display may comprise a Liquid Crystal Display (LCD), an Organic Light Emitting Diode (OLED) display, or some other type of display. In another respect, the user interface may include one or more speakers for aurally presenting the streaming media and/or the media clip.

The user interaction between the client station 700 and a user may include the user interface 704 receiving user input. The user interface 704 may include a button pad with one or more buttons that may be pressed to provide the user input and electronic circuitry to create a signal representative of the user input. Alternatively, or in combination, the user interface 704 may include a touch-sensitive display screen (e.g., a capacitive touch screen) that may be touched by a user's finger or an instrument (e.g., a stylus) to provide the user input and electronic circuitry to create a signal representative of the user input.

As an example, the user interface 704 may receive a first user input that identifies a first portion of the streaming media 200 as the MCSP 224 and a second user input that identifies a second portion of the streaming media 200 as the MCEP 226. The first user input and the second user input may be received by the user interface 704 during presentation of the streaming media 200 by the user interface 704.

As another example, the user interface 704 may receive user input for correlating a media clip with a particular function carried out at the client station 700 or via the network system 102. Correlation of the media clip to the particular function may occur by correlating the media clip to the program logic executable by the processor 706 to cause the function to occur. As an example, the particular function may include playing the media clip as a ring tone to alert a user that the client station 106 is receiving an incoming call. As another example, the particular function may include playing the media clip as a ringback tone to a caller calling the client station 700. In this regard, the client station 700 can convey to the network system 102 or to another server or entity interfacing to the network 104 a message indicating the correlation so as to enable the network system 102 or the other server or entity to play the media clip as the ringback tone. Other examples of user inputs the user interface 704 may receive are also possible.

The processor 706 may comprise one or more general purpose processors (e.g., INTEL microprocessors) and/or one or more special purpose processors (e.g., digital signal processors). The data storage 708 may comprise one or more volatile and/or nonvolatile storage components such as magnetic, optical, or organic storage, and may be integrated in whole or in part with processor 706. Alternatively, the data storage 708 may be remote from the processor 706 and may communicate with the processor 706 via the connection mechanism 710.

The data storage 708 may store various types of data. In one respect, the data storage 708 may store program logic (e.g., program instructions) executable by the processor 706. As an example, the program logic may be arranged to cause the processor 706 to establish at least one message indicating the identified media clip start point and the identified media clip end point. The program logic to establish the at least one message may include program logic to establish at least one message arranged as the message 500.

As another example, the program logic may be arranged to cause the communication interface 702 to transmit the at least one message to the network system 102 so as to enable the network system 102 to establish a media clip defined as a portion of the streaming media extending from the MCSP 224 to the MCEP 226.

As yet another example, the program logic may be arranged to determine when the communication interface 702 is receiving an incoming call and to responsively present a media clip to a user. In this way, the media clip may be presented as a ring tone and/or as visual call alert.

As still yet another example, the program logic may be configured to cause the user interface 704 to display the media clip as a screen saver and/or a background image. The screen saver may be used to display a moving image after a predetermined period of inactivity by a user of the client station 700. The background image may be an image upon which other images such as icons and pop-up menus are displayed.

In yet another respect, the data storage 708 may store program logic executable by the processor 706 to cause the data storage 708 to store the one or more media clips. The one or more media clips may include a media clip sent from the network system 102, as well as a default media clip stored in the data storage 708 at the time the client station 700 is manufactured or distributed.

3. Exemplary Operation

Figure 8:
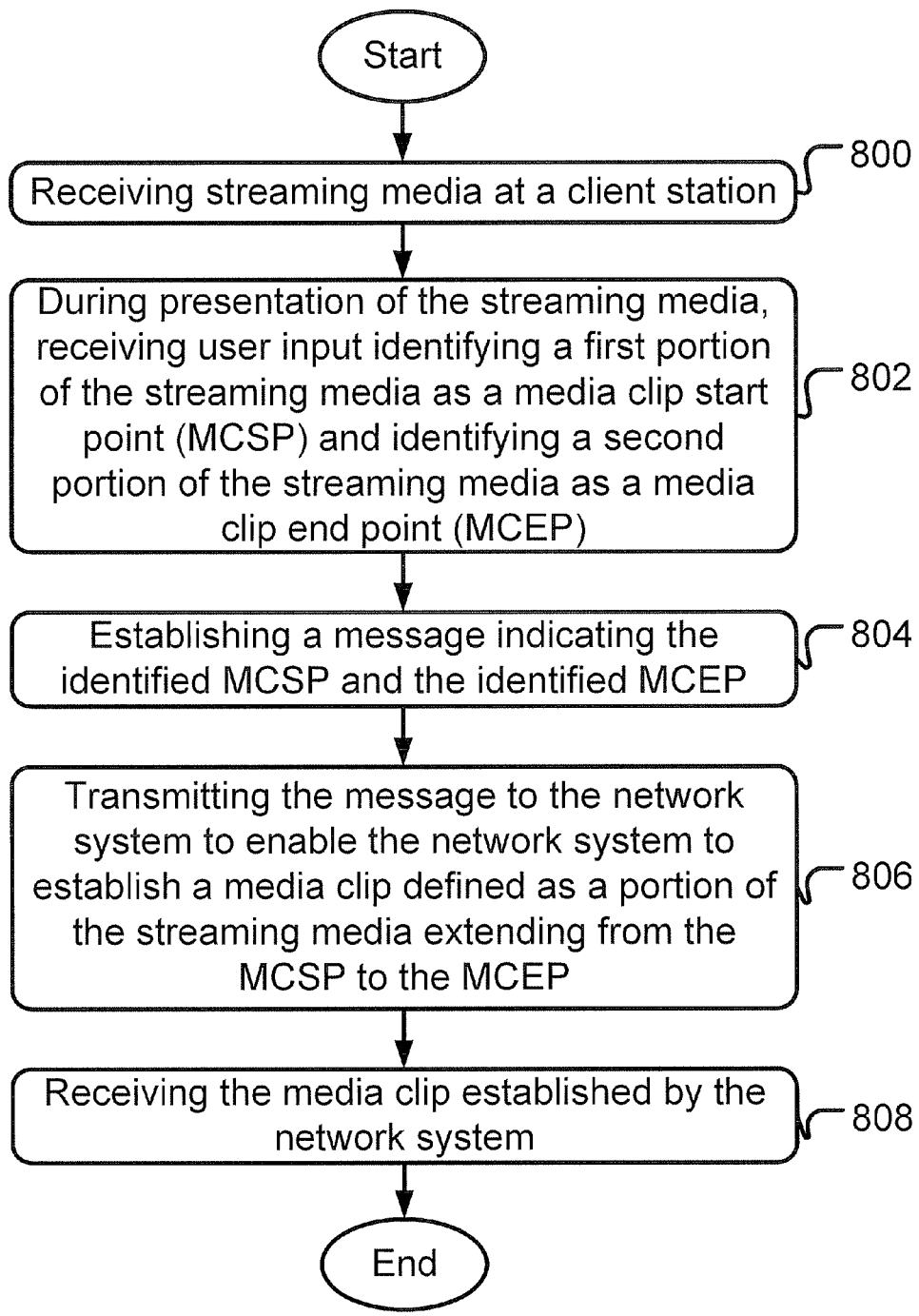
FIG. 8 is a flow chart depicting a set of functions that can be carried out in accordance with exemplary embodiments of the present invention.

FIG. 8 is a flow chart provided to illustrate some functions that may be carried out in accordance with exemplary embodiments of the present invention. The functions shown in FIG. 8 may be carried out in an order as shown in the figure (i.e., from top to bottom). Moreover, the functions may be carried out discretely or two or more of the functions may be carried out in combination.

As shown in FIG. 8, block 800 includes receiving streaming media at a client station. For example, the client station 700 may receive the streaming media 200 sent from the network system 102 via the network 104. After receiving at least a portion of the streaming media 200 (e.g., the first RTP payload 202 and the second RTP payload 204), the client station 700 may begin presenting the streaming media 200 to a user via the user interface 704. In this way, the streaming media 200 may be presented as the streaming media 200 is being received (e.g. the first RTP payload 202 may be presented as the third RTP payload 206 is being received).

Next, block 802 includes receiving user input identifying a first portion of the streaming media as a media clip start point (MCSP) and identifying a second portion of the streaming media as a media clip end point (MCEP). Receiving the user input may occur during presentation of the streaming media at the client station 700. For example, during presentation of the streaming media 200, the user interface 704 may receive first user input in response to a user pushing a button to identify a first portion of the streaming media 200 as the MCSP 224 and second user input in response to a user pushing the button (or another button) to identify a second portion of the streaming media 200 as the MCEP 226. Receiving the user input may occur while the client station 106 is receiving the streaming media 200. Other examples of receiving the user input are also possible.

Next, block 804 includes establishing a message indicating the identified media clip start point and the identified media clip end point. The message may include a message such as the message 500 that identifies the MCSP 224 and the MCEP 226. Establishing the message may also include establishing more than one message such as a first message that identifies the MCSP 224 and a second message that identifies the MCEP 226. No order is implied by the terms first message and second message, as the client station 700 may establish the first message and then the second message or may establish the second message and then the first message.

The message 500 may be established at various times with respect to when the client station 700 receives the streaming media 200. For example, the message 500 may be established while the client station 700 is receiving the streaming media 200. As another example, the message 500 may be established after the client station receives the streaming media 200. As yet another example, in the case where the content of the message 500 is arranged in more than one message, a first message identifying the MCSP 224 may be established while the client station 700 is receiving the streaming media 200 and a second message identifying the MCEP 226 may be established after the client station 700 receives the streaming media 200.

Next, block 806 includes transmitting the message to the network system 102 to enable the network system 102 to establish a media clip defined as a portion of the streaming media 200 extending from the MCSP 224 to the MCEP 226.

The message 500 may be transmitted to the network system 102 at various times with respect to when the client station 700 receives the streaming media 200. For example, the message 500 may be transmitted while the client station 700 is receiving the streaming media 200 or after the client station 700 receives the streaming media 200. As another example, a first message identifying the MCSP 224 may be established while the client station 700 is receiving the streaming media 200 and a second message identifying MCEP 226 may be established after the client station 700 receives the streaming media 200.

The network system 102 may receive the message 500 and responsively establish the media clip. The network system 102 may receive the message 500 at various times with respect to when the network system 102 transmits the streaming media 200. For example, the network system 102 may receive the message 500 while the network system 102 is transmitting the streaming media 200 or after the network system 102 has transmitted the streaming media 200. As another example, the network system 102 may receive a first message identifying the MCSP 224 while the network system 102 is transmitting the streaming media 200 and receive a second message identifying the MCEP 226 after the network system 102 transmits the streaming media 200.

In response to receiving the message 500, the network system 102 may establish the media clip defined as a portion of the streaming media 200 extending from the MCSP 224 to the MCEP 226. The network system 102 may execute program instructions to establish the media clip. For example, program instructions may cause a media file that was transmitted as the streaming media 200 to be retrieved from the data storage 704 and to strip off portions of the media file to create the media clip extending from the MCSP 224 to the MCEP 226. As another example, the program instructions may cause the media clip to be saved in a media clip format specified in the media type request 520.

The media clip established by the network system may be arranged according to any of a variety of media formats. For example, an audible media clip may be arranged as according to the MP3 format, the way format, the amr format, the MIDI, the mmf format, or some other audible media format. As another example, a visual media clip may be arranged according to the MPEG format, the JPEG format, the bitmap format, or some other visual media format.

Further, in response to receiving the message 500 (and prior to establishing the media clip), the network system 102 may access account data stored in the data storage 604 so as to verify that an account associated with a user of the client station 700 is arranged to permit establishing a media clip for the user. If the user's account permits the network system 102 to establish media clips, the network system 102 may charge the user's account a fee for establishing the media clip and thereafter establish the media clip. If the media clip is established from streaming media that is copyrighted, a wireless carrier managing the network system 102 may provide a portion of the fee charged to the user's account to a holder of the streaming media copyright. If the user's account does not permit the network system 102 to establish a media clip for the user, the network system 102 may send to the client station 700 a message that indicates the requested media clip cannot be established.

Next, block 808 includes receiving the media clip established by the network system. In one respect, the network system 102 may transmit the media clip to the client station 700 and the client station 700 may receive the media clip. After receiving the media clip, the client station 700 may store the media clip in the data storage 708. The client station 700 may use the media clip for any of a variety of purposes. For example, the client station 700 use the media clip as a ring tone in response to receiving an incoming call at the client station, a visual call alert, a screen saver, and/or a background image.

In another respect, the network system 102 may transmit the media clip to a cellular wireless network and the cellular wireless network may receive the media clip. The cellular wireless network may include a cellular wireless network server (e.g., a service node) for receiving the media clip. The cellular wireless network may determine when a calling mechanism is placing a call to the client station 700 and responsively transmit the media clip to the calling mechanism so as to enable the calling mechanism to play the media clip as a ring back tone. Other exemplary uses of the media clip established by the network system 102 are also possible.

4. Conclusion

Exemplary embodiments of the present invention have been described above. Those skilled in the art will understand, however, that changes and modifications may be made to the embodiments described without departing from the true scope and spirit of the present invention, which is defined by the claims.

I claim:

1. A method comprising:

identifying, by a client station during presentation of streaming media sent to the client station from a network system, a first portion of the streaming media as a media clip start point and identifying a second portion of the streaming media as a media clip end point, wherein the first portion of the streaming media is sent to the client station via a first payload associated with a first sequence number, and the second portion of the streaming media is sent to the client station via a second payload associated with a second sequence number;

establishing, by the client station, a message that includes (i) a media clip start point definition that identifies the first sequence number, and a parameter for determining a media clip start point identified within a portion of the media file contained in the first payload associated with the first sequence number, (ii) a media clip end point definition that identifies the second sequence number, and a parameter for determining a media clip end point identified within another portion of the media file contained in the second payload associated with the second sequence number, and (iii) a request for the network system to establish a media clip;

transmitting, by the client station to the network system, the established message to request the network system to establish a media clip defined as a portion of the streaming media extending from the media clip start point to the media clip end point; and receiving and storing in data storage, by the client station, the media clip established by the network system.

2. The method of claim 1, wherein the client station comprises a cellular wireless device.

3. The method of claim 2, wherein the cellular wireless device comprises the data storage, and wherein the method further comprises:

the client station identifying the media clip as a ring tone for incoming calls; and the client station receiving an incoming call and responsively presenting the media clip as a ring tone for the incoming call.

4. The method of claim 2, wherein the cellular wireless device comprises: (i) a display, (ii) a processor, and (iii) the data storage, wherein the data storage contains program logic executable by the processor, and the program logic contains logic selected from the group consisting of (i) logic for displaying the media clip as a screen saver, (ii) logic for displaying the media clip as a background image, and (iii) logic for displaying the media clip as an incoming call alert, and wherein presentation of the streaming media includes presenting the streaming media on the display, the method further comprising:

the client station correlating the media clip with the program logic; and the client station executing the program logic so as to display the media clip on the display.

5. The method of claim 2, wherein the network system comprises at least one server, wherein the at least one server transmits the streaming media to the client station via a network, wherein the at least one server receives the at least one message and responsively establishes the media clip, and wherein the at least one server transmits the media clip to the client station via the network.

6. The method of claim 2, wherein presentation of the streaming media occurs as the client station receives the streaming media.

7. The method of claim 6, wherein the client station establishes the message as the client station receives the streaming media.

8. The method of claim 2, wherein the streaming media is streamed to the client station according to a Real-time Transport Protocol (RTP), and wherein the message is arranged according to a Real Time Streaming Protocol (RTSP).

9. The method of claim 2, wherein a wireless carrier provides a user of the client station with access to the network system, the method further comprising:

the wireless carrier charging an account associated with the user a fee for the network system establishing the media clip.

10. The method of claim 9, further comprising:

the wireless carrier providing at least a portion of the fee to a copyright holder of the media stream.

11. A client station comprising:

a communication interface that is operable to receive a media file stream sent from a network system and to transmit a message to the network system for establishing a media clip, wherein the media file stream includes a first sequence number, a first payload associated with the first sequence number, a second sequence number, and a second payload associated with the second sequence number, and wherein the message includes (i) a media clip start point definition that identifies the first sequence number, and a parameter for determining a media clip start point identified within a portion of the media file contained in the first payload associated with the first sequence number, (ii) a media clip end point definition that identifies the second sequence number, and a parameter for determining a media clip end point identified within another portion of the media file contained in the second payload associated with the second sequence number, and (iii) a request for the network system to establish a media clip;

a user interface that is operable to (i) present a part of a media file contained in the first payload and to receive data that identifies the media clip start point during presentation of the part of the media file contained in the first payload, and (ii) present a part of the media file contained in the second payload and to receive data that identifies the media clip end point during presentation of the part of the media filed contained in the second payload, a processor; and data storage that contains program logic executable by the processor, wherein the program logic is configured to (i) cause the processor to establish the message, and (ii) cause the communication interface to transmit the message to the network system to enable the network system to strip off at least one portion of the media file to establish a media clip defined as a portion of the media file extending from the media clip start point to the media clip end point.

12. The client station of claim 11, wherein the communication interface is operable to receive the media clip from the network system, and wherein the program logic is further configured to cause the media clip to be stored in the data storage.

13. The client station of claim 12, wherein the program logic is further configured to make a determination that the communication interface is receiving an incoming call and to present the media clip at the user interface in response to the determination.

14. The client station of claim 12, wherein the user interface presents the media clip aurally.

15. The client station of claim 12, wherein the program logic further includes program logic selected from the group consisting of (i) program logic configured to cause the user interface to display the media clip as a screen saver, (ii) program logic configured to cause the user interface to display the media clip as a background image, and (iii) program logic configured to cause the user interface to display the media clip in response to receiving an incoming call at the communication interface.

16. A method comprising:

streaming, by a network system to a client station, a media file by way of a network that the network system and the client station each interface, wherein streaming the media file includes providing to the client station a first sequence number, a first payload associated with the first sequence number, a second sequence number, and a second payload associated with the second sequence number;

receiving, by the network system from the client station, a message that includes (i) a media clip start point definition that identifies the first sequence number, and a parameter for determining a media clip start point identified within a portion of the media file contained in the first payload associated with the first sequence number, (ii) a media clip end point definition that identifies the second sequence number, and a parameter for determining a media clip end point identified within another portion of the media file contained in the second payload associated with the second sequence number, and (iii) a request for the network system to establish a media clip; and stripping off, by the network system based on the media clip start point definition and the media clip end point definition, at least one portion of the media file to establish a media clip defined as a portion of the media file extending from the media clip start point to the media clip end point.

17. The method of claim 16, wherein the client station comprises a cellular wireless device, and wherein the method further comprises:
the network system providing the media clip to the cellular wireless device via the network so as to enable the cellular wireless device to present the media clip,
wherein presentation of the media clip occurs in response to the cellular wireless device receiving an incoming call.

18. The method of claim 16,
wherein the network comprises a cellular wireless network,
wherein the client station comprises a cellular wireless device, and
wherein the method further comprises:
the network system providing the media clip to the cellular wireless network, and
transmitting the media clip from the cellular wireless network to a calling mechanism placing a call to the cellular wireless device so as to enable the calling mechanism to play the media clip as a ring back tone.

19. The method of claim 18,
wherein the network system comprises at least one network server,
wherein the at least one network server streams the media file to the client station via the network, and
wherein the at least one network server receives the at least one message from the client station via the network and responsively establishes the media clip.

20. The method of claim 18, further comprising:
the network system providing the media clip to the cellular wireless device via the network so as to enable the cellular wireless device to use the media clip as a ring tone in response to the cellular wireless device receiving an incoming call.

21. The method of claim 16,
wherein a wireless carrier provides the user of the client station with access to the network system, and
wherein the wireless carrier manages an account associated with the user,
the method further comprising:
the wireless carrier charging the account associated with the user a fee for the network system establishing the media clip.

22. The method of claim 1, wherein the message comprises a first message that includes the data that identifies the first sequence number and the parameter associated with the media clip start point, and a second message that includes the data that identifies the second sequence number and the parameter associated with the media clip end point.

23. The method of claim 1, wherein the message comprises a single message that includes the data that identifies the first sequence number and the parameter associated with the media clip start point, and the data that identifies the second sequence number and the parameter associated with the media clip end point.

24. The method of claim 1,
wherein the streaming media is arranged in accordance with a first media format,
wherein the message further includes a media type request that indicates a second media format, and
wherein the media clip is arranged in accordance with the second media format.

25. The method of claim 16, wherein the network system receives the message from the client station while the network system is streaming the media file to the client station.

26. The method of claim 16, wherein the network system receives the message from the client station after the network system finishes streaming the media file to the client station.

27. The method of claim 2,
wherein the cellular wireless device comprises: (i) a display, (ii) a processor, and (iii) data storage for storing the media clip and program logic executable by the processor, and
wherein presentation of the streaming media includes presenting the streaming media on the display,
the method further comprising:
the client station storing the media clip in the data storage;
the client station receiving an input to correlate the media clip with program logic for displaying the media clip as an incoming call alert; and
the client station executing the program logic, in response to an incoming call, so as to display the media clip on the display.

28. The method of claim 24, wherein the first media format is an MP3 format, and the second media format is selected from the group consisting of a waveform audio format, an AMR format, a MIDI format, and an MMF format.

29. The method of claim 1,
wherein the parameter associated with the media clip start point indicates a first number of data bits, and
wherein the parameter associated with the media clip end point indicates a second number of data bits.

30. The method of claim 29,
wherein the first number of data bits indicates a number of data bits selected from the group consisting of (i) how many data bits of the first payload were presented prior to detection of an input that identifies the media clip start point, and (ii) how many data bits of the first payload remain to be presented after detection of the input that identifies the media clip start point, and
wherein the second number of data bits indicates a number of data bits selected from the group consisting of (i) how many data bits of the second payload were presented prior to detection of an input that identifies the media clip end point, and (ii) how many data bits of the second payload remain to be presented after detection of the input that identifies the media clip end point.

31. The method of claim 1,
wherein the parameter associated with the media clip start point comprises a parameter selected from the group consisting of (i) a time parameter that indicates how long the client station has been presenting the first payload at a time an input that identifies the media clip start point is detected, and (ii) a time parameter that indicates how much time is required to finish presenting the first payload at the time the input that identifies the media clip start point is detected, and
wherein the parameter associated with the media clip end point comprises a parameter selected from the group consisting of (i) a time parameter that indicates how long the client station has been presenting the second payload at a time an input that identifies the media clip end point is detected, and (ii) a time parameter that indicates how much time is required to finish presenting the second payload at the time the input that identifies the media clip end point is detected.

32. The client station of claim 11,
wherein the media file is arranged in accordance with a first media format,
wherein the message includes a media type request that indicates a second media format, and
wherein the media clip is arranged in accordance with the second media format.

33. The method of claim 16,
wherein the media file is arranged in accordance with a first media format,
wherein the message includes a media type request that indicates a second media format, and
wherein the media clip is arranged in accordance with the second media format.

\* \* \* \* \*